(12) United States Patent
Tsang et al.

(10) Patent No.: US 6,450,632 B1
(45) Date of Patent: Sep. 17, 2002

(54) UNDERPRINTING FLUID COMPOSITIONS TO IMPROVE INKJET PRINTER IMAGE COLOR AND STABILITY

(75) Inventors: Joseph W Tsang, Corvallis, OR (US); John R Moffatt, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/687,848

(22) Filed: Oct. 12, 2000

(51) Int. Cl.[7] .................................................. B41J 2/17
(52) U.S. Cl. .......................................... 347/96; 347/100
(58) Field of Search ........................... 347/100, 96, 99, 347/101

(56) References Cited

U.S. PATENT DOCUMENTS

| | | |
|---|---|---|
| 2,833,736 A | 5/1958 | Glaser et al. |
| 3,607,813 A | 9/1971 | Purcell et al. |
| 4,104,061 A | 8/1978 | Roberts |
| 4,576,649 A | 3/1986 | Oliver et al. |
| 4,694,302 A | 9/1987 | Hackleman et al. |
| 4,770,706 A | 9/1988 | Pietsch |
| 5,026,755 A | 6/1991 | Kveglis et al. |
| 5,409,796 A * | 4/1995 | Fuller et al. ................. 430/115 |
| 5,549,740 A * | 8/1996 | Takahashi et al. ........... 347/100 |
| 5,624,484 A | 4/1997 | Takahashi et al. |
| 5,640,187 A | 6/1997 | Kashiwazaki et al. |
| 5,746,818 A | 5/1998 | Yatake |
| 5,792,249 A | 8/1998 | Shirota et al. |

* cited by examiner

Primary Examiner—John Barlow
Assistant Examiner—Manish Shah
(74) Attorney, Agent, or Firm—W. Bradley Haymond

(57) ABSTRACT

Cationic underprinting fluids, which together with pigment-based ink compositions achieve enhanced durability, chroma, optical density and print quality in inkjet printed images.

60 Claims, No Drawings

UNDERPRINTING FLUID COMPOSITIONS TO IMPROVE INKJET PRINTER IMAGE COLOR AND STABILITY

FIELD OF INVENTION

The present invention relates to the use of underprinting fluid in inkjet printing, and, more specifically, to chemical compositions of underprinting fluid, which combined with inkjet ink, achieve improvements in both color and stability of inkjet printed images.

BACKGROUND OF INVENTION

The use of inkjet printing systems has grown dramatically in recent years. This growth may be attributed to substantial improvements in print resolution and overall print quality coupled with appreciable reduction in cost. Today's inkjet printers offer acceptable print quality for many commercial, business, and household applications at costs fully an order of magnitude lower than comparable products available just a few years ago. Notwithstanding their recent success, intensive research and development efforts continue toward improving inkjet print quality, while further lowering cost to the consumer.

An inkjet image is formed when a precise pattern of dots is ejected from a drop-generating device known as a "printhead" onto a printing medium. The typical inkjet printhead has an array of precisely formed nozzles located on a nozzle plate and attached to an inkjet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu$m×35 $\mu$m. The printhead is held and protected by an outer packaging referred to as a print cartridge, i.e., inkjet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

Inks normally used in inkjet recording are commonly composed of water-soluble organic solvents (humectants, etc.), surfactants, and colorants in a predominantly aqueous fluid. When a recording is made on "plain paper", the deposited colorants retain some mobility, which can be manifest in bleed, poor edge acuity, feathering, and inferior optical density/chroma (due to penetration of the paper). These features adversely impact text and image quality.

The evaporation rate of water-based inks is low and they dry primarily by the adsorption into paper. The adsorption time of an ink is dependent on many factors, such as the ink drop size, paper mesh size, ink viscosity, and the ink spreading coefficient over the paper (that is, the surface tension of the paper minus the surface tension of inks and the interfacial tension of the paper-ink interface). There is a considerable interest in reducing the ink drying time, in particular, for high throughput printers. However, shortening the drying time is normally attained at the expense of the image quality. Thus, adding surfactants to inks can significantly reduce the penetration time. This however decreases the optical density/chroma and the edge acuity of the image, as well as ultimately leading to strikethrough problems, because of the penetration of the colorants in normal and lateral directions of the paper.

To address these problems, methods have been developed in which a "fixer" solution, with components to reduce colorant mobility, is deposited on the paper prior to depositing the ink. This "under-printing" of imaging ink uses compositions containing acids, salts, and organic counter ions and polyelectrolytes. Underprinting is defined as applying a transparent liquid on paper just before applying inks. The idea is to apply "a separate reactive component" before the inks in order to improve waterfastness. The "reactive component" reacts with a reactant present in the inks, producing a polymer that binds the colorant and makes it waterfast. Bifunctional acylchlorides and bifunctional amines, for example, are possible reactive pairs. However, acylchlorides are very reactive and require a nonaqueous ink vehicle. Another example of a reactive pair includes carboxymethylcellulose in the presence of aluminum salt which together form a gel. This reaction is more benign than the first, but has the drawback that carboxymethylcellulose solutions have a high viscosity even without the polyvalent ions present. This makes it difficult to use in an inkjet.

In other disclosures, the underprinting idea has been further developed. For example, Using a cationic "liquid composition" such as a polyallylamine for underprinting of anionic dyes has been used to achieve a fixer, which reacts broadly with dye based systems as a whole.

A broad class of underprinting liquids for polymer dispersed pigments has also been disclosed, including polymer latexes, silica, alumina and titanium oxide particles, polymer resins, buffer solutions, and inorganic salts. All these underprinting liquids destabilize the pigment dispersions by various mechanisms. As a result, the pigment substantially precipitates at the surface of the paper, while the vehicle is quickly adsorbed.

In another system has been described that uses water-soluble dyes and an underprinting fixer, the fixer contains ligand-complexed metal ions (metal ion with an associated ligand). The ink used in this system contains an anionic component, which may be the dye itself. The ink may also contain a polymeric viscosity modifier. The specific polymeric viscosity modifier can be an ethylene oxide adduct of acetylene glycol—a neutral polymer which unlike the present invention does not interact strongly with the fixer.

Another system disclosed uses dispersed pigment colorants and requires a glycol ether cosolvent in the ink. This is unlike the system of the present invention, which uses water soluble pigment colorants with little cosolvent restriction.

SUMMARY OF THE INVENTION

The present invention relates to an inkjet ink composition comprising:

an aqueous solvent and at least one pigment, wherein the at least one pigment comprises macromolecular chromophores having a zeta potential of from 100 to 900 millivolts;

and wherein, when the ink composition and an underprinting fixer fluid are mixed together to form a mixture, a portion of the at least one pigment in the ink composition precipitates out of the mixture;

and wherein the fixer fluid comprises at least one cationic component.

The present invention also relates to an underprinting fixer fluid comprising:

at least one cationic component, wherein, when the fixer fluid and an inkjet ink comprising at least one pigment and an aqueous solvent are mixed together to form a mixture, a portion of the at least one pigment precipitates out of the mixture, and wherein the at least one pigment comprises macromolecular chromophores having a zeta potential of from 100 to 900 millivolts.

Furthermore, the present invention relates to a method of inkjet printing, the method comprising the steps of:

a) ejecting at a pixel location on a medium an ink composition comprising at least one pigment; and b) immediately before and/or immediately after ejecting the ink composition, ejecting at the pixel location on the medium an underprinting fixer fluid comprising at least one cationic component;

wherein, when the fixer fluid and an inkjet ink comprising at least one pigment are mixed together to form a mixture, a portion of the at least one pigment precipitates out of the mixture;

and wherein the at least one pigment comprises macromolecular chromophores having a zeta potential of from 100 to 900 millivolts.

Also, the present invention relates to an inkjet printing apparatus comprising:

at least one printhead portion, the printhead portion having at least two ejector portions; and at least one reservoir portion having at least two reservoir chambers, each reservoir chamber providing fluid to one of the at least two ejector portions, and at least one of the reservoir chambers including an underprinting fixer fluid comprising at least one cationic component;

and at least one of the reservoir chambers including an ink composition comprising an aqueous solvent and at least one pigment;

wherein when the underprinting fixer fluid and the ink composition are mixed together to form a mixture, a portion of the at least one pigment in the ink composition precipitates out of the mixture;

and wherein the at least one pigment comprises macromolecular chromophores having a zeta potential of from 100 to 900 millivolts. In addition, the present invention relates to a fluid delivery apparatus for providing fluid to an inkjet printing system, the fluid delivery apparatus comprising: a reservoir portion having at least two reservoir chambers, each reservoir chamber providing fluid to one of the at least two ejector portions, and at least one of the reservoir chambers including an underprinting fixer fluid comprising at least one cationic component; and at least one of the reservoir chambers including an ink composition comprising an aqueous solvent and at least one anionic pigment;

wherein when the underprinting fixer fluid and the ink composition are mixed together to form a mixture, a portion of the at least one anionic pigment in the ink composition precipitates out of the mixture;

and wherein the at least one pigment comprises macromolecular chromophores having a zeta potential of from 100 to 900 millivolts.

DETAILED DESCRIPTION OF THE INVENTION

The present invention described herein is directed to inkjet inks for printing inkjet images and fixer fluids for underprinting inkjet images using commercially available inkjet printers such as, for example but not limited to, HP DeskJet® printers, manufactured by Hewlett-Packard Company, of Palo Alto, Calif. The inks and fixer fluids enable production of near photographic images having little or no coalescence, excellent waterfastness, and reduced dry time, on a range of print media, in particular, for example but not limited to, plain white, 8½ "×11", 20 lb. weight, printer paper conventionally used for office and home computers.

The present invention relates to an inkjet ink composition comprising:

an aqueous solvent and at least one pigment, wherein the at least one pigment comprises macromolecular chromophores having a zeta potential of from 100 to 900 millivolts, and wherein, when the ink composition and an underprinting fixer fluid are mixed together to form a mixture, a portion of the at least one pigment in the ink composition precipitates out of the mixture, and wherein the fixer fluid comprises at least one cationic component.

The present invention also relates to an underprinting fixer fluid comprising: at least one cationic component;

wherein, when the fixer fluid and an inkjet ink comprising at least one pigment and an aqueous solvent are mixed together to form a mixture, a portion of the at least one pigment precipitates out of the mixture, and wherein the at least one pigment comprises macromolecular chromophores having a zeta potential of from 100 to 900 millivolts.

In addition, the present invention relates to a method of inkjet printing, the method comprising the steps of:

a) ejecting at a pixel location on a medium an ink composition comprising at least one pigment; and b) immediately before and/or immediately after ejecting the ink composition, ejecting at the pixel location on the medium an underprinting fixer fluid comprising at least one cationic component, wherein, when the fixer fluid and an inkjet ink comprising at least one pigment are mixed together to form a mixture, a portion of the at least one pigment precipitates out of the mixture, and wherein the at least one pigment comprises macromolecular chromophores having a zeta potential of from 100 to 900 millivolts.

Furthermore, the present invention relates to an inkjet printing apparatus comprising:

at least one printhead portion, the printhead portion having at least two ejector portions; and at least one reservoir portion having at least two reservoir chambers, each reservoir chamber providing fluid to one of the at least two ejector portions, and at least one of the reservoir chambers including an underprinting fixer fluid comprising at least one cationic component;

and at least one of the reservoir chambers including an ink composition comprising at an aqueous solvent and least one pigment;

wherein when the underprinting fixer fluid and the ink composition are mixed together to form a mixture, a portion of the at least one anionic pigment in the ink composition precipitates out of the mixture;

and wherein the at least one pigment comprises macromolecular chromophores having a zeta potential of from 100 to 900 millivolts.

Also, the present invention relates to a fluid delivery apparatus for providing fluid to an inkjet printing system, the fluid delivery apparatus comprising:

a reservoir portion having at least two reservoir chambers, each reservoir chamber providing fluid to one of the at least two ejector portions, and at least one of the reservoir chambers including an underprinting fixer fluid comprising at least one cationic component, and at least one of the reservoir chambers including an ink composition comprising at least one anionic pigment;

wherein when the underprinting fixer fluid and the ink composition are mixed together to form a mixture, a portion of the at least one anionic pigment in the ink composition precipitates out of the mixture;

and wherein the at least one pigment comprises macromolecular chromophores having a zeta potential of from 100 to 900 millivolts.

In certain embodiments of the above-described inkjet ink composition, underprinting fixer fluid, method of inkjet printing, inkjet printing apparatus, and fluid delivery apparatus, the at least one cationic component in the fixer fluid is selected from the group consisting of

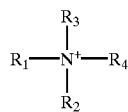

where $R_1$, $R_2$, and $R_3$ are selected from the group consisting of alkyl groups of from 1 to 25 carbons, alkoxyl groups of from 1 to 25 carbons and aryl groups of from 1 to 25 carbons;

and where $R_4$ is selected from the group consisting of hydrogen, alkyl groups of from 1 to 25 carbons, alkoxyl groups of from 1 to 25 carbons and aryl groups of from 1 to 25 carbons and

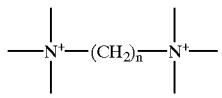

where n=0–12.

In other embodiments of the above-described inkjet ink composition, underprinting fixer fluid, method of inkjet printing, inkjet printing apparatus, and fluid delivery apparatus, the fixer fluid comprises at least one cationic compound having a molecular weight less than 500 selected from the group consisting of ammonium groups, phosphonium groups and cationic metals.

In yet other embodiments of the above-described inkjet ink composition, underprinting fixer fluid, method of inkjet printing, inkjet printing apparatus, and fluid delivery apparatus, the fixer fluid comprises cationic polymers having a molecular weight from 1,000 to 100,000.

In preferred embodiments of the above-described inkjet ink composition, underprinting fixer fluid, method of inkjet printing, inkjet printing apparatus, and fluid delivery apparatus, the cationic polymers are selected from the group consisting of polyethyleneimines, water-soluble cationic dendrimers, water-dispersed alkoxylated forms of polyethyleneimines, water-dispersed alkoxylated forms of dendrimers, water-soluble alkoxylated forms of dendrimers and poly diallyl dimethyl ammonium chloride. In more preferred embodiments of the above-described inkjet ink composition, underprinting fixer fluid, method of inkjet printing, inkjet printing apparatus, and fluid delivery apparatus, the fixer fluid comprises cationic polymers having a molecular weight from 2,000 to 15,000.

The pigment particles or macromolecular chromophores (MMCs) for use in the present ink formula comprises chemical modifications to impart water solubility. After modification, the resulting surface of the MMC consists of carboxylate, phosphate, and/or sulfonate functionalities for anionic chromophores, and ammonium, quaternary ammonium, or phosphonium functionalities for cationic chromophores.

The MMC colorant particles of the present invention preferably have a useful mean diameter ranging from 0.005 to 12 $\mu$m in solution. Colorants of this type result from chemical reactions where solvent-accessible functional groups are derivatized to provide solubilizing groups that render the colorant soluble in water. The resulting MMC is water-soluble, with its solubility being similar to that of well-known, commercially-used, water-soluble acidic and basic dyes.

Furthermore, these MMCs behave as charged particles in aqueous solutions as one can measure zeta potentials of these colorants in solution, typically in a range 900 to 100 millivolts (mV). In typical concentrations used in inkjet inks, the zeta ($\zeta$) potential are found to be between 120 to 400 millivolts (mV). See table below.

| Concentration | $\zeta$ Potential (mV) | | |
|---|---|---|---|
| (wt %) | SA-PB 15:4[1] | SA-PR 122[2] | SA-PY 74[3] |
| 0.25 | 858 | 792 | 918 |
| 0.50 | 686 | 610 | 637 |
| 1.0 | 473 | 473 | 365 |
| 2.0 | 281 | 305 | 199 |
| 3.0 | 199 | 220 | 135 |
| 5.0 | 123 | 139 | 80 |

[1]SA-PB 15:4 is Pigment Blue 15:4 modified with sulfanilic acid such that the sulfonate groups are covalently attached to the pigment surface. This colorant was manufactured by Cabot Corporation (Billerica, MA).
[2]SA-PR 122 is Pigment Red 122 modified with sulfanilic acid such that the sulfonate groups are covalently attached to the pigment surface. This colorant was manufactured by Cabot Corporation (Billerica, MA).
[3]SA-PY74 is sulfanilic acid treated Pigment Yellow 74 sulfanilic acid such that the sulfonate groups are covalently attached to the pigment surface. This colorant was manufactured by Cabot Corporation (Billerica, MA).

Therefore, in a another embodiment of the above-described inkjet ink composition, underprinting fixer fluid, method of inkjet printing, inkjet printing apparatus, and fluid delivery apparatus, the at least one pigment is a macromolecular chromophore selected from the group consisting of anionic macromolecular chromophores and cationic macromolecular chromophores wherein, both the anionic and cationic macromolecular chromophores have water solubility-imparting surface groups, the surface groups of the anionic chromophores being selected from the group consisting of carboxylate groups, phosphate groups and sulfonate groups; the surface groups of the cationic chromophores being selected from the group consisting of ammonium groups, quaternary ammonium groups, and phosphonium groups.

In a more preferred embodiment of the above-described invention, the macromolecular chromophores have a diameter of from 0.005 to 12 pm in aqueous solution.

MMCs described in this invention include black, cyan, magenta, and yellow colors. The following pigments comprise a partial list of useful colorants in this invention. These water-soluble black MMCs are made from commercially available pigments obtained from colorant vendors such as Cabot Corp. and Orient Chemical.

Many pigments are useful in the practice of this invention. These pigments are available from Cabot: Monarch® 1400, Monarch® 1300, Monarch® 1100, Monarch® 1000, Monarch® 900, Monarch® 880, Monarch® 800, and Monarch® 700. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from Dupont.

The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Hoechst: Permanent Yellow GR, Permanent Yellow G, Permanent Yellow NCG-71, Permanent Yellow GG, Hansa Yellow RA, Hansa Brillant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, Indofast® Violet. The following pigments are available from Sun Chemicals: L74-1357 Yellow, L75-1331 Yellow, and L75-2577 Yellow, 272-0559 Yellow, 272-0574 Yellow, 273-0652 Yellow, 248-3758 Blue, 248-6921 Blue, 248-3754 Blue, 249-1292 Blue, 249-4350 Blue, 264-3120 Green, 246-8137 Green, 464-1645 Green, 246-0487 Violet, 428-5024 Red, 419-5092 Red, 476-5056 Orange, 276-3016 Orange.

Added polymers increase the viscosity of the fixer solution. Careful attention should be paid during formulation to the polymer molecular weight and its concentration in solution.

In yet other embodiments of the above-described inkjet ink composition, underprinting fixer fluid, method of inkjet printing, inkjet printing apparatus, and fluid delivery apparatus, the amount of macromolecular chromophore in the ink composition is from 0.1 to 10 weight percent. In preferred embodiments of the above-described inkjet ink composition, underprinting fixer fluid, method of inkjet printing, inkjet printing apparatus, and fluid delivery apparatus, the amount of macromolecular chromophore in the ink composition is from 0.1 to 5 weight percent.

In still another embodiment of the above-described inkjet ink composition, underprinting fixer fluid, method of inkjet printing, inkjet printing apparatus, and fluid delivery apparatus, the macromolecular chromophores have a diameter of from 0.005 to 12 $\mu$m in aqueous solution.

In yet another embodiment of the above-described inkjet ink composition, underprinting fixer fluid, method of inkjet printing, inkjet printing apparatus, and fluid delivery apparatus the zeta potential of the macromolecular chromophores is from 120 to 400 millivolts.

In still another embodiment of the above-described inkjet ink composition, underprinting fixer fluid, method of inkjet printing, inkjet printing apparatus, and fluid delivery apparatus the at least one cationic component is a surfactant.

The inks made according to the present invention comprise at least one pigment. The amount of pigment added to the vehicle in prior compositions and the inventive compositions tend to be a function of choice, and is largely dependent upon solubility of the pigment in the vehicle and the color intensity of the pigment. Typical amounts of pigment are between about 0.1 wt % to about 10 wt % of ink composition, preferably, between about 0.1 and 5 wt %.

Most water-soluble pigments contain some anionic groups, such as sulfonates and carboxylates, which help render the pigments water-soluble. These groups often also serve as reaction sites for the precipitation of the pigment with the fixer on top of the paper after underprinting fluid and ink are applied to the paper. Usually, underprinting is conducted by printing a fluid on the paper at a certain pixel location before the ink image is printed in the same pixel location.

When two oppositely charged species approach each other in solution, they tend to form a complex. The positively and negatively charged groups are attracted together, while their former counter-ions leave their hosts and remain in solution. This behavior is well documented for oppositely charged surfactants, which aggregate into bilayers (lamellar phase and vesicles), and oppositely charged polymer-surfactant pairs, which form a complex and a precipitate. This effect is augmented by the fact that the associating molecules neutralize each other's charge directly and counter-ions are released into the solution. These counter-ions compensate for the loss in entropy, which normally opposes the association.

In other words, a necessary condition for the ink/underprinting fluid combination of the present invention is maintaining control of colorant penetration versus vehicle penetration. Thus, the reaction between pigment-based ink and underprinting fluid must precipitate out the pigment on a time scale faster than the penetration rate of the ink into the paper in order to stratify dye colorants properly on the surface of the print media. Underprinting fluids may also add surfactants to "carry" the ink vehicle into the paper, allowing much faster penetration times. This approach allows the colorant to stratify, concentrating the colorant on the surface of the paper, boosting chroma and/or optical density, and allowing the bulk of the ink (the vehicle) to penetrate into the media.

Surfactants suitably employed in the practice of the invention include anionic and nonionic surfactants. Examples of anionic surfactants include: Sulfonate surfactants such as Sulfosuccinates (Aerosol TO, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO). These surfactants provide the necessary dot spread on plain paper and special media, such as photobase glossy paper, for providing excellent image quality.

The inks of the present invention may optionally comprise components such as buffers, metal shelters, and biocides, as are well known in the art of inkjet ink formulation. The ink compositions of this invention comprise the modified pigment colorants above plus a vehicle. For a discussion of inks and their properties, see The Printing Manual, $5^{th}$ ed. Leach et al. (Chapman and Hall, 1993) which is incorporated herein by reference. See also U.S. Pat. Nos. 2,833,736; 3,607,813; 4,104,061; 4,770,706; and 5,026,755.

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 4 to about 6 and most preferably from about 4 to about 5. Examples of preferably-employed buffers include succinic acid, tris(hydroxymethyl)aminomethane, available from companies such as Aldrich Chemical (Milwaukee, Wis.), 4-morpholineethanesulfonic acid (MES), and 4-morpholinepropanesulfonic acid (MOPS). Most preferably, succinic acid is employed in the practice of the invention.

The inks of the present invention optionally comprise from 0 to about 1.5 wt % buffer. More preferably, the inks comprise from about 0.1 to about 0.5 wt % buffer, with a concentration from about 0.1 to about 0.3 wt % being the most preferred. Metal chelators optionally employed in the practice of the invention are used to bind transition metal cations that may be present in the ink. Examples of preferably-employed metal chelators include: EDTA, Diethylenetetraaminepentaacetic acid (DTPA), trans-1,2-diaminocyclohexanetetraacetic acid (CDTA), (ethylenedioxy) diethylene dinitrilotetraacetic acid (EGTA), malonic acid, salicylic acid or other chelators that can bind transition metal cations. More preferably, EDTA, and DTPA, and most preferably, EDTA in its disodium salt form is employed in the practice of the invention.

The inks of the present invention optionally comprise from 0 to about 1.5 wt % metal chelator. More preferably, the inks comprise from about 0.1 to about 0.5 wt % metal chelator, with a concentration from about 0.1 to about 0.3 wt % being the most preferred.

Organotin chelators optionally employed in the practice of the invention are used to bind organotin compound that may leach into the ink. Examples of preferably-employed organotin chelators include: 2,6-pyridinecarboxylic acid, 1,2-pyridylazo-2-naphthol and pyrocatecholl violet and other chelators that can bind organotin compounds. Most preferably, 2,6-pyridinedicarboxylic acid is employed in the practice of the invention.

Any of the biocides commonly employed in inkjet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide. The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

A typical but non-limiting formulation for a fixer useful in the practice of the invention includes one or more cosolvents (0 to about 50 wt %), one or more water-soluble surfactants/amphiphiles (0 to about 40, preferably about 1 to about 5, wt %), one or more high molecular weight polymer (0 to about 10 wt %), and water (balance).

One or more cosolvents may be added to the vehicle in the formulation of the fixer. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, sulfolane, and 1,3-dimethyl-2-imidazolidinone. The cosolvent concentration may range from 0 to about 50 wt %, with about 0.1 to 20 wt % being preferred.

All concentrations herein are in weight percent of total ink composition, unless otherwise indicated. The purity of all components is that employed in normal commercial practice for inkjet inks.

The improvement of color print quality and permanence of inkjet output. This is specifically achieved by focusing on the problem of obtaining high chroma/optical density in inkjet printed image colors and blacks while still maintaining good edge acuity, minimal strikethrough, fast drying time, and excellent waterfastness of pigment-based inks.

EXAMPLES

Example 1

Experiments were performed to establish how underprinting affects the optical density and waterfastness performance of the ink on typical plain papers such as Gilbert Bond (GBND) and Champion Datacopy (CDCY). Two fixer formulations (100 and 101) were evaluated on an ink containing an anionic MMC at 25% and 100% relative to the volume of the ink. The MMC used in this experiment is Pigment Blue 15:4 modified with sulfanilic acid such that the sulfonate groups are covalently attached to the pigment surface. This colorant was manufactured by Cabot Corporation (Billerica, Mass.).

For comparison purpose the ink performance without the use of fixer was included as the control. Results are tabulated in Table I below. In both cases, optical density remains the same or slightly higher with the use of either fixer. Waterfastness performance improved significantly in both papers. In addition, there is less colorant transfer with increased concentration of the fixers, 25% versus 100% for example. The colorants are precipitated and separated from ink vehicle by the cationic fixer.

The colorant does not readily redissolve in water in the waterfastness test.

Table 1 details the results of these tests.

TABLE 1

| Fixer | GBND | | | CDCY | | |
|---|---|---|---|---|---|---|
| | Under-printing | OD (OD unit)[6] | WF (5 min) (mOD unit)[7] | | OD (OD unit) | WF (5 min) (mOD unit) |
| None | 0% | 0.73 | 150 | | 0.78 | 30 |
| 100 | 25% | 0.75 | 38 | | 0.78 | 15 |
| 101 | 25% | 0.74 | 120 | | 0.78 | 23 |
| 100 | 100% | 0.74 | 1 | | 0.77 | 0 |
| 101 | 100% | 0.72 | 17 | | 0.78 | 22 |

Ink = 3% SA-PB15:4, 6% sulfolane; 5% LEG; 0.4% NDAO; 1% Surfynol 465 Fixer 100 = 6% sulfolane; 0.5% Surfynol 465; 2% Polydadmac (MW 240 K) Fixer 101 = 6% sulfolane; 0.5% Surfynol 465; 2% Polydadmac (MW 240K); 1% CTAB
[6]Optical density is expressed in OD units.
[7]The waterfastness test is performed 5 min after printing by dripping deionized water on a set of horizontal bars. The amount of ink transfer is measured between the bars, and the value indicates the degree of waterfastness. The lower values indicate the more waterfast ink.

Example 2

Experiments were performed to establish how underprinting affects the optical density and chroma values of cyan, magenta and yellow MMC inks on printed media. Chroma, $C^*$, is one of the three components of L.c.h. values which describe the 3-dimensional color space of a given color. In order to attain the largest color space possible, it is highly desirable to maximize the chroma values of the primary colors. Two fixer formulations (109 and 110) are tested against the cyan, magenta and yellow inks which are based on Pigment Blue 15:4, Pigment Red 122, and Pigment Yellow 74, respectively, each modified with sulfanilic acid such that the sulfonate groups are covalently attached to the pigment surface. These colorants were manufactured by Cabot Corporation (Billerica, Mass.). Results on the optical density and chroma values on a plain paper, Champion Datacopy (CDCY), and a coated paper (HPSP) developed by Hewlett Packard, are reported on Tables 2–7 below.

The fixers were printed at 25% and 100% with respect to the volume of the inks. At 100% underprinting with fixer 109 and 110, printing artifacts are evident where rapid precipitation of colorants provide mottled textures as oppose to evenly filled printed patterns. For these experiments, comparing the values at 25% underprinting reflect more accurately how chroma and optical density are being affected by the fixers. With fixers 109 and 110, chroma values increase with underprinting among the three colors in both plain and coated papers, except that the cyan ink showed little change in CDCY. Furthermore the magnitude of increases also indicated that the yellow and magenta inks are easier to fix than the cyan inks. Since sulfanilic acid treated PB15:4 has the smallest particle size and lowest zeta potential of the three color MMCs used here, it is less sensitive to the fixers comparing to the magenta and yellow colorants.

Fixer 109 consists of 9% sulfolane, 9% 2-pyrrolidone, 2% polydadmac MW 240K, and 1% CTAB, and fixer 110 consists of 9% sulfolane, 9% 1,5-pentanediol, 2% polydadmac MW 240K, and 1% CTAB. Cyan ink consists of 3% SA-PB 15:4, 6% sulfolane, 5% LEG-1, 0.4% NDAO, and 1% Surfynol 465; magenta inks consists of 4% SA-PR122, 6% sulfolane, 5% LEG-1, 0.4% NDAO, and 1% Surfynol 465; yellow inks consists of 5% SA-PY74, 6% sulfolane, 5% LEG-1, 0.4% NDAO, and 1% Surfynol 465.

Tables 2A through 2F detail the results of these tests.

TABLE 2A

| | Fixer 109 on Cyan | | |
|---|---|---|---|
| | Under-printing | Chroma | OD |
| CDCY | 0% | 41.5 | 0.85 |
| | 25% | 40.6 | 0.85 |
| | 100% | 40.1 | 0.81 |
| HPSP | 0% | 41.2 | 0.91 |
| | 25% | 43.6 | 0.91 |
| | 100% | 49.3 | 1.2 |

Ink = 3% SA-PB15:4, 6% sulfolane, 5% LEG-1, 0.4% NDAO, and 1% Surfynol 465 Fixer 109 = 9% sulfolane, 9% 2-pyrrolidone, 2% polydadmac MW 240K, and 1% CTAB

TABLE 2B

| | Fixer 109 on Magenta | | |
|---|---|---|---|
| | Under-printing | Chroma | OD |
| CDCY | 0% | 53.5 | 0.73 |
| | 25% | 56.8 | 0.86 |
| | 100% | 58.0 | 0.79 |
| HPSP | 0% | 57.4 | 0.84 |
| | 25% | 59.0 | 0.91 |
| | 100% | 59.6 | 0.87 |

Ink = 4% SA-PR122, 6% sulfolane, 5% LEG-1, 0.4% NDAO, and 1% Surfynol 465.
Fixer 109 = 9% sulfolane, 9% 2-pyrrolidone, 2% polydadmac MW 240K, and 1% CTAB

TABLE 2C

| | Fixer 109 on Yellow | | |
|---|---|---|---|
| | Under-printing | Chroma | OD |
| CDCY | 0% | 76.5 | 0.9 |
| | 25% | 81.0 | 1.0 |
| | 100% | 77.9 | 1.1 |
| HPSP | 0% | 85.7 | 1.1 |
| | 25% | 87.2 | 1.2 |
| | 100% | 96.5 | 1.2 |

Ink = 5% SA-PY74, 6% sulfolane, 5% LEG-1, 0.4% NDAO, and 1% Surfynol 465
Fixer 109 = 9% sulfolane, 9% 2-pyrrolidone, 2% polydadmac MW 240K, and 1% CTAB

TABLE 2D

| | Fixer 110 on Cyan | | |
|---|---|---|---|
| | Under-printing | Chroma | OD |
| CDCY | 0% | 41.7 | 0.85 |
| | 25% | 41.4 | 0.88 |
| | 100% | 39.6 | 0.80 |
| HPSP | 0% | 41.2 | 0.91 |
| | 25% | 42.3 | 0.90 |
| | 100% | 49.3 | 1.2 |

Ink = 3% SA-PB15:4, 6% sulfolane, 5% LEG-1, 0.4% NDAO, and 1% Surfynol 465
Fixer 110 = 9% sulfolane, 9% 1,5-pentanediol, 2% polydadmac MW 240K, and 1% CTAB.

TABLE 2E

| | Fixer 110 on Magenta | | |
|---|---|---|---|
| | Under-printing | Chroma | OD |
| CDCY | 0% | 53.5 | 0.73 |
| | 25% | 56.2 | 0.86 |
| | 100% | 52.2 | 0.76 |
| HPSP | 0% | 57.4 | 0.84 |
| | 25% | 59.3 | 0.91 |
| | 100% | 57.3 | 0.90 |

Ink = 4% SA-PR122, 6% sulfolane, 5% LEG-1, 0.4% NDAO, and 1% Surfynol 465.
Fixer 110 = 9% sulfolane, 9% 1,5-pentanediol, 2% polydadmac MW 240K, and 1% CTAB.

TABLE 2F

| | Fixer 110 on Yellow | | |
|---|---|---|---|
| | Under-printing | Chroma | OD |
| CDCY | 0% | 76.5 | 0.9 |
| | 25% | 81.0 | 1.0 |
| | 100% | 77.9 | 1.0 |
| HPSP | 0% | 85.7 | 1.1 |
| | 25% | 87.2 | 1.2 |
| | 100% | 96.5 | 1.2 |

Ink = 5% SA-PY74, 6% sulfolane, 5% LEG-1, 0.4% NDAO, and 1% surfynol 465
Fixer 110 = 9% sulfolane, 9% 1,5-pentanediol, 2% polydadmac MW 240K, and 1% CTAB.

While the foregoing invention has been described in some detail for purposes of clarity and understanding, it will be clear to one skilled in the art from the reading of this disclosure that various changes in form and detail can be made without departing from the true scope of the invention.

What is claimed is:

1. An inkjet ink composition comprising:

an aqueous solvent and at least one pigment, wherein the at least one pigment comprises macromolecular chromophores having a zeta potential of from 100 to 900 millivolts;

and wherein, when the ink composition and an underprinting fixer fluid are mixed together to form a mixture, a portion of the at least one pigment in the ink composition precipitates out of the mixture;

and wherein the fixer fluid comprises at least one cationic component.

2. The inkjet ink composition of claim 1, wherein the at least one cationic component in the fixer fluid is selected from the group consisting of

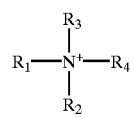

where $R_1$, $R_2$, and $R_3$ are selected from the group consisting of alkyl groups of from 1 to 25 carbons, alkoxide groups of from 1 to 25 carbons and aryl groups of from 1 to 25 carbons;

and where $R_4$ is selected from the group consisting of hydrogen, alkyl groups of from 1 to 25 carbons, alkoxide groups of from 1 to 25 carbons and aryl groups of from 1 to 25 carbons and

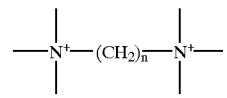

where n is from 0 to 12.

3. An inkjet ink composition according to claim 1 wherein the fixer fluid comprises at least one cationic compound having a molecular weight less than 500 selected from the group consisting of ammonium groups, phosphonium groups and cationic metals.

4. An inkjet ink composition according to claim 1 wherein the fixer fluid comprises cationic polymers having a molecular weight from 1,000 to 100,000.

5. The inkjet ink composition according to claim 4 wherein the cationic polymers are selected from the group consisting of polyethyleneimines, water-soluble cationic dendrimers, water-dispersed alkoxylated forms of polyethyleneimines, water-dispersed alkoxylated forms of dendrimers, water-soluble alkoxylated forms of dendrimers and poly diallyl dimethyl ammonium chloride.

6. The inkjet ink composition according to claim 4 wherein the fixer fluid comprises cationic polymers having a molecular weight from 2,000 to 15,000.

7. The inkjet ink composition according to claim 1 wherein the macromolecular chromophore is selected from the group consisting of anionic macromolecular chromophores and cationic macromolecular chromophores wherein, both the anionic and cationic macromolecular chromophores have water solubility-imparting groups covalently attached as surface groups to macromolecular chromophore surfaces, the surface groups of the anionic chromophores being selected from the group consisting of carboxylate groups, phosphate groups and sulfonate groups; the surface groups of the cationic chromophores being selected from the group consisting of ammonium groups, quaternary ammonium groups, and phosphonium groups.

8. The inkjet ink composition according to claim 1 wherein the amount of macromolecular chromophore in the ink composition is from 0.1 to 10 weight percent.

9. The inkjet ink composition according to claim 8 wherein the amount of macromolecular chromophore in the ink composition is from 0.1 to 5 weight percent.

10. The inkjet ink composition according to claim 1 wherein the macromolecular chromophores have a diameter of from 0.005 to 12 μm in aqueous solution.

11. The inkjet ink composition according to claim 1 wherein the zeta potential of the macromolecular chromophores is from 120 to 400 millivolts.

12. The inkjet ink composition according to claim 1 wherein the at least one cationic component is a surfactant.

13. An underprinting fixer fluid comprising:

at least one cationic component wherein, when the fixer fluid and an inkjet ink comprising at least one pigment and an aqueous solvent are mixed together to form a mixture, a portion of the at least one pigment precipitates out of the mixture wherein the at least one pigment comprises macromolecular chromophores having a zeta potential of from 100 to 900 millivolts.

14. The underprinting fixer fluid of claim 13, wherein the at least one cationic component in the fixer fluid is selected from the group consisting of

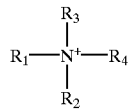

where $R_1$, $R_2$, and $R_3$ are selected from the group consisting of alkyl groups of from 1 to 25 carbons, alkoxide groups of from 1 to 25 carbons and aryl groups of from 1 to 25 carbons;

and where $R_4$ is selected from the group consisting of hydrogen, alkyl groups of from 1 to 25 carbons, alkoxide groups of from 1 to 25 carbons and aryl groups of from 1 to 25 carbons and

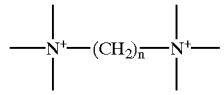

where $n=0-12$.

15. The underprinting fixer fluid according to claim 13 wherein the fixer fluid comprises at least one cationic compound having a molecular weight less than 500 selected from the group consisting of ammonium groups, phosphonium groups and cationic metals.

16. The underprinting fixer fluid according to claim 12 wherein the fixer fluid comprises cationic polymers having a molecular weight from 1,000 to 100,000.

17. The underprinting fixer fluid according to claim 16 wherein the at least one cationic component is selected from the group consisting of polyethyleneimines, water-soluble cationic dendrimers, water-dispersed alkoxylated forms of polyethyleneimines, water-dispersed alkoxylated forms of dendrimers, water-soluble alkoxylated forms of dendrimers and poly diallyl dimethyl ammonium chloride.

18. The underprinting fixer fluid according to claim 16 wherein the fixer fluid comprises cationic polymers having a molecular weight from 2,000 to 15,000.

19. The underprinting fixer fluid according to claim 13 wherein the macromolecular chromophore is selected from the group consisting of anionic macromolecular chromophores and cationic macromolecular chromophores wherein, both the anionic and cationic macromolecular chromophores have water solubility-imparting groups covalently attached as surface groups to macromolecular chromophore surfaces, the surface groups of the anionic chromophores being selected from the group consisting of carboxylate groups, phosphate groups and sulfonate groups; the surface groups of the cationic chromophores being selected from the group consisting of ammonium groups, quaternary ammonium groups, and phosphonium groups.

20. The underprinting fixer fluid according to claim 13 wherein the amount of macromolecular chromophore in the ink composition is from 0.1 to 10 weight percent.

21. The underprinting fixer fluid according to claim 20 wherein the amount of macromolecular chromophore in the ink composition is from 0.1 to 5 weight percent.

22. The underprinting fixer fluid according to claim 13 wherein the macromolecular chromophores have a diameter of from 0.005 to 12 µm in aqueous solution.

23. The underprinting fixer fluid according to claim 13 wherein the zeta potential of the macromolecular chromophores is from 120 to 400 millivolts.

24. The underprinting fixer fluid according to claim 13 wherein the at least one cationic component is a surfactant.

25. A method of inkjet printing, the method comprising the steps of:
   a) ejecting at a pixel location on a medium an ink composition comprising an aqueous solvent and at least one pigment; and
   b) immediately before and/or immediately after ejecting the ink composition, ejecting at the pixel location on the medium an underprinting fixer fluid comprising at least one cationic component wherein, when the fixer fluid and an inkjet ink comprising at least one pigment are mixed together to form a mixture, a portion of the at least one pigment precipitates out of the mixture;
   and wherein the at least one pigment comprises macromolecular chromophores having a zeta potential of from 100 to 900 millivolts.

26. The method of inkjet printing according to claim 25, wherein the at least one cationic component in the fixer fluid is selected from the group consisting of

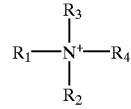

where $R_1$, $R_2$, and $R_3$ are selected from the group consisting of alkyl groups of from 1 to 25 carbons, alkoxyl groups of from 1 to 25 carbons and aryl groups of from 1 to 25 carbons;

and where $R_4$ is selected from the group consisting of hydrogen, alkyl groups of from 1 to 25 carbons, alkoxyl groups of from 1 to 25 carbons and aryl groups of from 1 to 25 carbons and

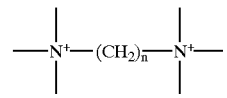

where $n=0-12$.

27. The method of inkjet printing according to claim 25, wherein the fixer fluid comprises at least one cationic compound having a molecular weight less than 500 selected from the group consisting of ammonium groups, phosphonium groups and cationic metals.

28. The method of inkjet printing according to claim 25 wherein the fixer fluid comprises cationic polymers having a molecular weight from 1,000 to 100,000.

29. The method of inkjet printing according to claim 28 wherein the cationic polymers are selected from the group consisting of polyethyleneimines, water-soluble cationic dendrimers, water-dispersed alkoxylated forms of polyethyleneimines, water-dispersed alkoxylated forms of dendrimers, water-soluble alkoxylated forms of dendrimers and poly diallyl dimethyl ammonium chloride.

30. The method of inkjet printing according to claim 29 wherein the fixer fluid comprises cationic polymers having a molecular weight from 2,000 to 15,000.

31. The method of inkjet printing according to claim 25 wherein the macromolecular chromophore is selected from the group consisting of anionic macro molecular chromophores and cationic macromolecular chromophores wherein, both the anionic and cationic macromolecular chromophores have water solubility-imparting surface groups, the surface groups of the anionic chromophores being selected from the group consisting of carboxylate groups, phosphate groups and sulfonate groups; the surface groups of the cationic chromophores being selected from the group consisting of ammonium groups, quaternary ammonium groups, and phosphonium groups.

32. The method of inkjet printing according to claim 25 wherein the amount of macromolecular chromophore in the ink composition is from 0.1 to 10 weight percent.

33. The method of inkjet printing according to claim 32 wherein the amount of macromolecular chromophore in the ink composition is from 0.1 to 5 weight percent.

34. The method of inkjet printing according to claim 25 wherein the macromolecular chromophores have a diameter of from 0.005 to 12 μm in aqueous solution.

35. The method of inkjet printing according to claim 25 wherein the zeta potential of the macromolecular chromophores is from 120 to 400 millivolts.

36. The method of inkjet printing according to claim 31 wherein the at least one cationic component is a surfactant.

37. An inkjet printing apparatus comprising:
at least one printhead portion, the printhead portion having at least two ejector portions; and
at least one reservoir portion having at least two reservoir chambers, each reservoir chamber providing fluid to one of the at least two ejector portions, and at least one of the reservoir chambers including an underprinting fixer fluid comprising at least one cationic component;
and at least one of the reservoir chambers including an ink composition comprising an aqueous solvent and at least one pigment;
wherein when the underprinting fixer fluid and the ink composition are mixed together to form a mixture, a portion of the at least one pigment in the ink composition precipitates out of the mixture;
and wherein the at least one pigment comprises macromolecular chromophores having a zeta potential of from 100 to 900 millivolts.

38. The inkjet printing apparatus according to claim 37, wherein the at least one cationic component in the fixer fluid is selected from the group consisting of

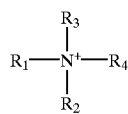

where $R_1$, $R_2$, and $R_3$ are selected from the group consisting of alkyl groups of from 1 to 25 carbons, alkoxyl groups of from 1 to 25 carbons and aryl groups of from 1 to 25 carbons;
and where $R_4$ is selected from the group consisting of hydrogen, alkyl groups of from 1 to 25 carbons, alkoxyl group of from 1 to 25 carbons and aryl groups of from 1 to 25 carbons and

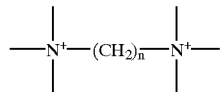

where n=0–12.

39. The inkjet printing apparatus according to claim 37 wherein the fixer fluid comprises at least one cationic compound having a molecular weight less than 500 selected from the group consisting of ammonium groups, phosphonium groups and cationic metals.

40. The inkjet printing apparatus according to claim 37 wherein the fixer fluid comprises cationic polymers having a molecular weight from 1,000 to 100,000.

41. The inkjet printing apparatus according to claim 40 wherein the cationic polymers are selected from the group consisting of polyethyleneimines, water-soluble cationic dendrimers, water-dispersed alkoxylated forms of polyethyleneimines, water-dispersed alkoxylated forms of dendrimers, water-soluble alkoxylated forms of dendrimers and poly diallyl dimethyl ammonium chloride.

42. The inkjet printing apparatus according to claim 40 wherein the fixer fluid comprises cationic polymers having a molecular weight from 2,000 to 15,000.

43. The inkjet printing apparatus according to claim 37 wherein the macromolecular chromophore is selected from the group consisting of anionic macro molecular chromophores and cationic macromolecular chromophores wherein, both the anionic and cationic macromolecular chromophores have water solubility-imparting surface groups, the surface groups of the anionic chromophores being selected from the group consisting of carboxylate groups, phosphate groups and sulfonate groups; the surface groups of the cationic chromophores being selected from the group consisting of ammonium groups, quaternary ammonium groups, and phosphonium groups.

44. The inkjet printing apparatus according to claim 37 wherein the amount of macromolecular chromophore in the ink composition is from 0.1 to 10 weight percent.

45. The inkjet printing apparatus according to claim 44 wherein the amount of macromolecular chromophore in the ink composition is from 0.1 to 5 weight percent.

46. The inkjet printing apparatus according to claim 37 wherein the macromolecular chromophores have a diameter of from 0.005 to 12 μm in aqueous solution.

47. The inkjet printing apparatus according to claim 37 wherein the zeta potential of the macromolecular chromophores is from 120 to 400 millivolts.

48. The inkjet printing apparatus according to claim 37 wherein the at least one cationic component is a surfactant.

49. A fluid delivery apparatus for providing fluid to an inkjet printing system, the fluid delivery apparatus comprising:
a reservoir portion having at least two reservoir chambers, each reservoir chamber providing fluid to one of the at least two ejector portions, and at least one of
the reservoir chambers including an underprinting fixer fluid comprising at least one cationic component
and at least one of the reservoir chambers including an ink composition comprising an aqueous solvent and at least one anionic pigment;
wherein when the underprinting fixer fluid and the ink composition are mixed together to form a mixture, a portion of the at least one anionic pigment in the ink composition precipitates out of the mixture;
and wherein the at least one pigment comprises macromolecular chromophores having a zeta potential of from 100 to 900 millivolts.

50. The fluid delivery apparatus according to claim 49, wherein the at least one cationic component in the fixer fluid is selected from the group consisting of

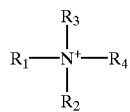

where $R_1$, $R_2$, and $R_3$ are selected from the group consisting of alkyl groups of from 1 to 25 carbons, alkoxyl groups of from 1 to 25 carbons and aryl groups of from 1 to 25 carbons;

and where $R_4$ is selected from the group consisting of hydrogen, alkyl groups of from 1 to 25 carbons, alkoxyl groups of from 1 to 25 carbons and aryl groups of from 1 to 25 carbons and

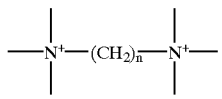

where n=0–12.

51. The fluid delivery apparatus according to claim 49 wherein the fixer fluid comprises at least one cationic compound having a molecular weight less than 500 selected from the group consisting of ammonium groups, phosphonium groups and cationic metals.

52. The fluid delivery apparatus according to claim 49 wherein the fixer fluid comprises cationic polymers having a molecular weight from 1,000 to 100,000.

53. The fluid delivery apparatus according to claim 52 wherein the cationic polymers are selected from the group consisting of polyethyleneimines, water-soluble cationic dendrimers, water-dispersed alkoxylated forms of polyethyleneimines, water-dispersed alkoxylated forms of dendrimers, water-soluble alkoxylated forms of dendrimers and poly diallyl dimethyl ammonium chloride.

54. The fluid delivery apparatus according to claim 53 wherein the fixer fluid comprises cationic polymers having a molecular weight from 2,000 to 15,000.

55. The fluid delivery apparatus according to claim 49 wherein the macromolecular chromophore is selected from the group consisting of anionic macro molecular chromophores and cationic macromolecular chromophores wherein, both the anionic and cationic macromolecular chromophores have water solubility-imparting surface groups, the surface groups of the anionic chromophores being selected from the group consisting of carboxylate groups, phosphate groups and sulfonate groups; the surface groups of the cationic chromophores being selected from the group consisting of ammonium groups, quaternary ammonium groups, and phosphonium groups.

56. The fluid delivery apparatus according to claim 49 wherein the amount of macromolecular chromophore in the ink composition is from 0.1 to 10 weight percent.

57. The fluid delivery apparatus according to claim 56 wherein the amount of macromolecular chromophore in the ink composition is from 0.1 to 5 weight percent.

58. The fluid delivery apparatus according to claim 49 wherein the macromolecular chromophore has a diameter from 0.005 to 12 μm in aqueous solution.

59. The fluid delivery apparatus according to claim 49 wherein the zeta potential of the macromolecular chromophores is from 120 to 400 millivolts.

60. The fluid delivery apparatus according to claim 45 wherein the at least one cationic component is a surfactant.

* * * * *